(12) United States Patent
Chang

(10) Patent No.: US 8,676,927 B2
(45) Date of Patent: Mar. 18, 2014

(54) METHOD AND APPARATUS OF MANAGING CONTACT LISTS AWARE OF USER INTERESTS

(75) Inventor: Chaochi Chang, Banqiao (TW)

(73) Assignee: France Telecom, Paris (FR)

( * ) Notice: Subject to any disclaimer, the term of this patent is extended or adjusted under 35 U.S.C. 154(b) by 511 days.

(21) Appl. No.: 13/076,288

(22) Filed: Mar. 30, 2011

(65) Prior Publication Data

US 2011/0244838 A1    Oct. 6, 2011

Related U.S. Application Data

(60) Provisional application No. 61/319,246, filed on Mar. 30, 2010.

(51) Int. Cl.
*G06F 15/16*    (2006.01)
(52) U.S. Cl.
USPC .......................................... 709/217; 709/206
(58) Field of Classification Search
None
See application file for complete search history.

(56) References Cited

U.S. PATENT DOCUMENTS

| 2007/0135110 A1* | 6/2007 | Athale et al. ................... 455/418 |
| 2007/0198253 A1* | 8/2007 | Luehrig et al. ................ 704/221 |
| 2007/0254687 A1* | 11/2007 | Nassimi ..................... 455/550.1 |
| 2008/0208722 A1* | 8/2008 | Hollerman et al. ............. 705/35 |
| 2009/0036163 A1* | 2/2009 | Kimbrell ....................... 455/558 |

\* cited by examiner

*Primary Examiner* — Peling Shaw
(74) *Attorney, Agent, or Firm* — David D. Bush; Westman, Champlin & Koehler, P.A.

(57) ABSTRACT

A method of managing contact lists on a plurality of mobile devices, the mobile devices being connected to a network. The method sensing one or more communications provided by a plurality of broadcast services, the one or more communications including contact information; selecting the contact information of the sensed one or more communications in which a user of a mobile device is interested; adding the selected contact information in a contact list associated with the mobile device of the user; determining contact information that has expired; and removing the expired contact information from the contact list associated with the mobile device of the user.

21 Claims, 4 Drawing Sheets

US 8,676,927 B2

METHOD AND APPARATUS OF MANAGING CONTACT LISTS AWARE OF USER INTERESTS

CROSS-REFERENCE TO RELATED APPLICATIONS

This application claims the benefit of U.S. Provisional Patent Application No. 61/319,246, filed Mar. 30, 2010, the entire content of which is incorporated herein by reference thereto.

FIELD OF THE PRESENT SYSTEM

The present system relates to a system and a method for dynamically inserting in/removing from the phone contact list on users' mobile devices, contact entries of time sensitive communications in which a user is interested.

BACKGROUND OF THE PRESENT SYSTEM

Many time sensitive but infrequent communications on mobile devices' require a considerable effort on the part of the users of the mobile devices to initiate. For example, to take advantage of discounts on items advertised on TV's shopping channels, the users of the mobile devices are required to dial, digit by digit, the full phone number displayed on the TV screen just before or during the short time when the viewers are asked to call the number. In another example, it is hard for the users of the mobile devices listening to radio broadcasts, especially while driving, to call in to radio stations to express their opinions about the topics being discussed on the air without a quick dial shortcut to dial their mobile devices. In such situations, the viewers or listeners have very limited time to remember and then dial the mentioned phone numbers.

U.S. Patent Publication No. 2007/135110 incorporated herein as if set out in its entirety proposes a call list interface. However, it describes displaying a ranked device list of the best number/device to reach a callee and a mechanism to initiate the communication by trying to connect to difference devices by a ranking.

The present system solves the above described problems by dynamically updating a contact list on users' mobile devices. Thus, the users interested in calling certain phone numbers relevant to time sensitive communications will no longer be required to dial the phone number digit by digit.

SUMMARY OF THE PRESENT SYSTEM

It is an object of the present system to overcome disadvantages and/or make improvements in the prior art.

Accordingly, the present system provides a method of managing contact lists on a plurality of mobile devices, the mobile devices being connected to a network. The method includes sensing one or more time sensitive communications provided by a plurality of broadcast services, the one or more time sensitive communications including contact information; selecting the contact information of the sensed one or more time sensitive communications in which a user of a mobile device is interested; adding the selected contact information to a contact list associated with the mobile device of the user; determining contact information that has expired; and removing the expired contact information from the contact list associated with the mobile device of the user.

BRIEF DESCRIPTION OF THE DRAWINGS:

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Figure 1:
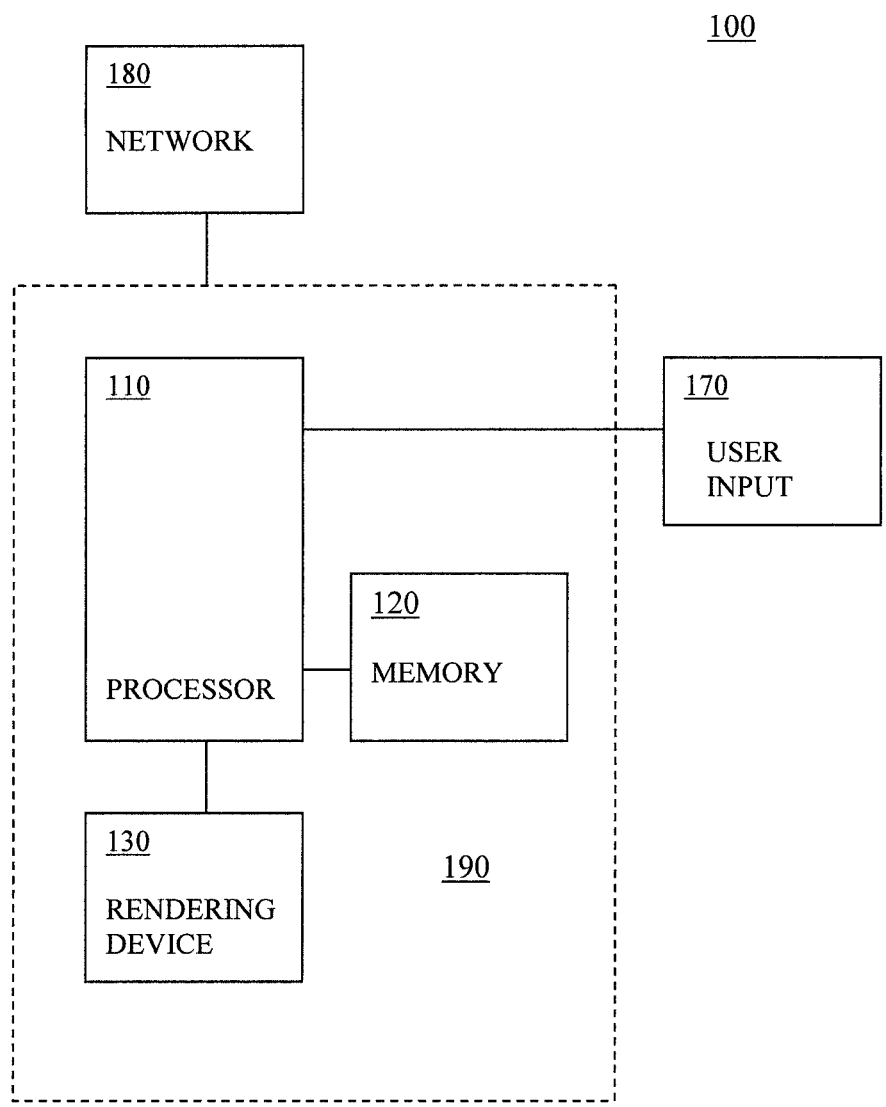
FIG. 1 is a block diagram of a mobile device in accordance with embodiments of the present system.

FIG. 1 shows a system 100 that includes a mobile device 190 that has a processor 110 operationally coupled to a memory 120, a rendering device 130, such as one or more of a display, speaker, etc., a user input device 170 and a network 180 operationally coupled to the mobile device 190 in accordance with embodiments of the present system. The memory 120 may be any type of device for storing application data, such as an encryption plug-in in accordance with the present system, as well as other data. The application data and other data are received by the processor 110 for configuring the processor 110 to perform operation acts in accordance with the present system. The processor 110 so configured becomes a special purpose machine particularly suited for performing in accordance with the present system.

The user input 170 may include a keyboard, mouse, trackball or other devices, including touch sensitive displays, which may be stand alone or be a part of a system, such as part of a personal computer, personal digital assistant, mobile phone, converged device, or other rendering device for communicating with the processor 110 via any type of link, such as a wired or wireless link. The user input device 170 is operable for interacting with the processor 110 including interaction within a paradigm of a User Interface such as a Graphical User Interface and/or other elements of the present system, such as to enable web browsing, content selection, such as provided by left and right clicking on a device, a mouse-over, pop-up menu, radio button, etc., such as provided by user interaction with a computer mouse, etc., as may be readily appreciated by a person of ordinary skill in the art.

In accordance with an embodiment of the present system, the rendering device 130 may operate as a touch sensitive display for communicating with the processors 110 (e.g., providing selection of a web browser, a Uniform Resource Locator (URL), portions of web pages, etc.) and thereby, the rendering device 130 may also operate as a user input device. In this way, a user may interact with the processor 110 including interaction within a paradigm of a UI, such as to support composing a message, inviting an addressee to participate in a confidential communication, etc. Clearly the mobile device 190, the processor 110, memory 120, rendering device 130 and/or mobile device 170 may all or partly be portions of a computer system or other device, and/or be embedded in a portable device, such as a mobile station (MS), mobile telephone, personal computer (PC), personal digital assistant (PDA), converged device such as a smart telephone, etc.

The methods of the present system are particularly suited to be carried out by a computer software program, such program containing modules corresponding to one or more of the individual acts or acts described and/or envisioned by the present system. Such program may of course be embodied in a computer-readable medium, such as an integrated chip, a peripheral device or memory, such as the memory 120 or other memory coupled to the processor 110.

The computer-readable medium and/or memory 120 may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling etc. Any medium known or developed that may store and/or transmit information suitable for use with a computer system may be used as the computer-readable medium and/or memory 120.

Additional memories may also be used. The computer-readable medium, the memory 120, and/or any other memories may be long-term, short-term, or a combination of long-term and short-term memories. These memories configure processor 110 to implement the methods, operational acts, and functions disclosed herein. The operation acts may include controlling the rendering device 130 to render elements in a form of a UI and/or controlling the rendering device 130 to render other information in accordance with the present system. The memories may be implemented as electrical, magnetic or optical memory, or any combination of these or other types of storage devices.

The network 180 should be understood to include further network connections to other mobile devices, systems (e.g., servers), etc. While not shown for purposes of simplifying the following description, it is readily appreciated that the network 180 may include an operable interconnection between processors, memories, displays and user inputs similar as shown for the mobile device 190, as well as networked servers, such as may host web sites, etc. Accordingly, while the description contained herein focuses on details of interaction within components of the mobile device 190 and other mobile devices and servers, it should be understood to similarly apply to interactions of other devices operably coupled to the network 180.

The processor 110 is capable of providing control signals and/or performing operations in response to input signals from the user input device 170 and executing instructions stored in the memory 120. The processor 110 may be an application-specific or general-use integrated circuit(s). Further, the processor 110 may be a dedicated processor for performing in accordance with the present system or may be a general-purpose processor wherein only one of many functions operates for performing in accordance with the present system. The processor 110 may operate utilizing a program portion, multiple program segments, or may be a hardware device utilizing a dedicated or multi-purpose integrated circuit.

The present method may be offered to the user of the mobile device 190 through a subscription and further download of a software client on said mobile device 190. Such a client may enable the mobile device 190 to implement embodiments of the present method. For instance, such a client may be operable to open one or more communication channels to listen for one or more time sensitive communications from a plurality of broadcast services.

Figure 2:
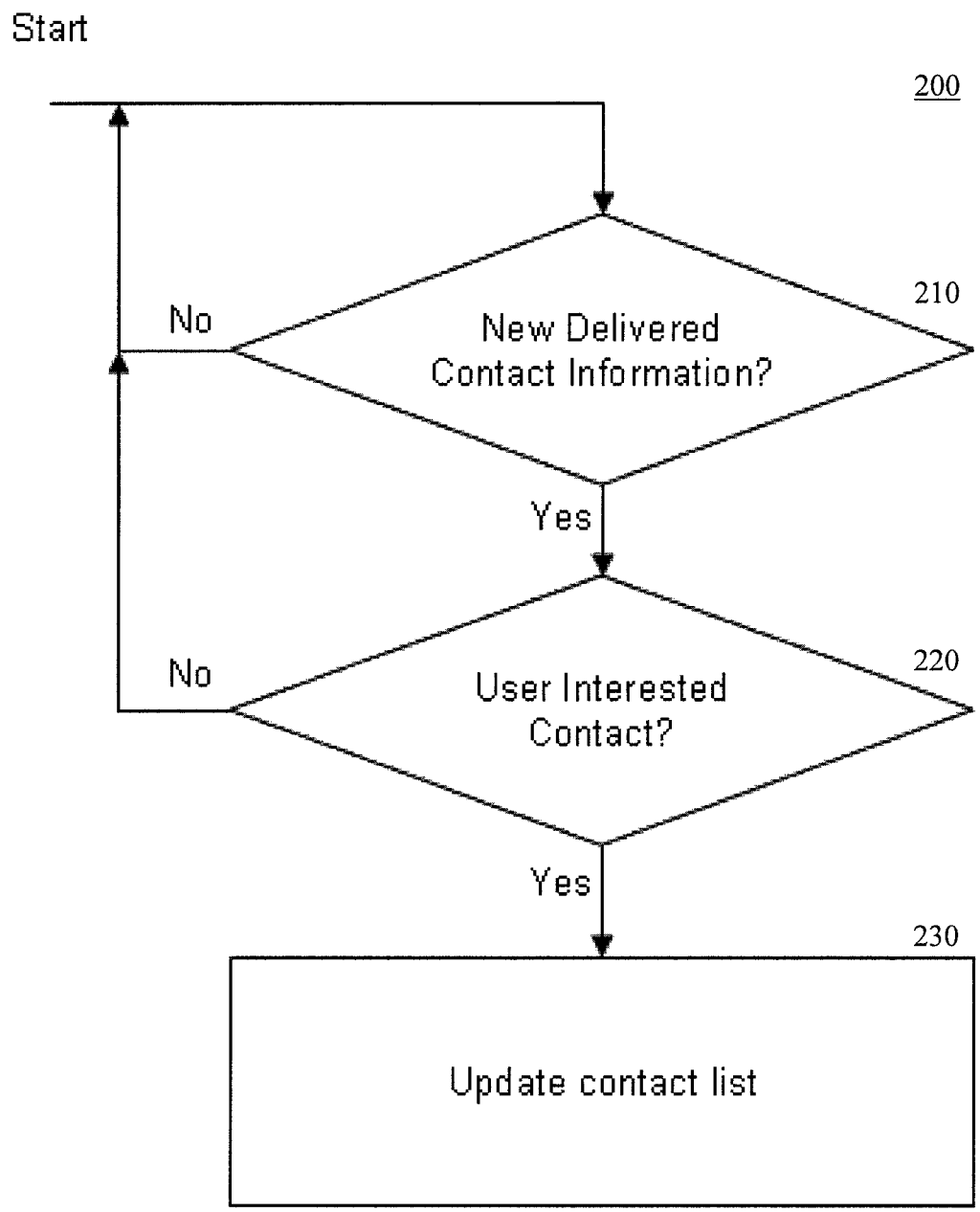
FIG. 2 is a flow chart of an update process executing on a mobile device for updating a contact list in accordance with embodiments of the present system.

In accordance with the present invention, an update process 200 shown in FIG. 2 in accordance with embodiments of the present system is executed on the device 190 to listen to or sense any new contact information emitted comprised in communications from various sources, such as broadcast services, in order to record this information in the contact list maintained in the memory 120 or on some media accessible to the device 190, e.g., over the network.

The emission of the new contact information from the various sources, e.g., television and radio devices, may be carried out in audio form in a form of a human voice. For example, a program host or DJ will vocalize the phone number for shoppers or listeners to call in. The update process 200 receives the audio emission of the new contact information using the mobile device 190 microphone (not shown in FIG. 1) and recognizes the vocalized phone number as contact information. The identification of the contact information may be performed using known voice recognition engines, or speech to text engines coupled to a Natural Language Processing tool.

The television, radio, or loudspeaker devices may also emit the contact information over wireless beacon like channel in a wireless beacon form recognized by the update process 200. In this instance, an antenna (not shown in FIG. 1) of mobile device 190 may be used to capture the time sensitive communication. In the case of a television, a Wi-Fi or Bluetooth enabled TV set top box can broadcast the contact information associated with a current TV program in a wireless beacon form recognizable by the update process 200 that is programmed to listen to the wireless beacon. Furthermore, the contact information can be emitted in a uni-cast manner. For example, a conference bridge device can deliver the contact information including a conference call number to the update process 200 running on the device 190 of each of the participants.

Additionally, public announcement systems, such as transportation terminals and stations, supermarkets, movie theaters, malls, airports, and stadiums may transmit telephone numbers in case of some emergency, or persons being lost or being paged. Such announcements may be verbal over a loudspeaker or as described above over a beacon.

Figure 3:
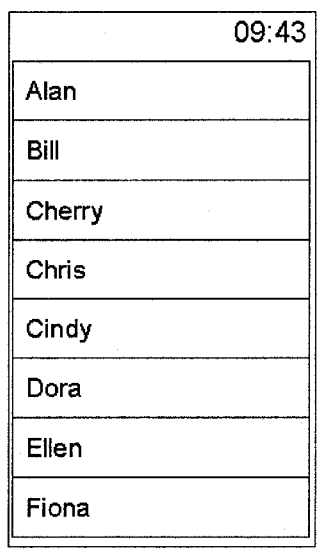
FIG. 3 is a diagram of a contact list accessible by a mobile device before receipt of the new contact information in accordance with embodiments of the present system.

Upon receipt of the contact information, during act 210, the update process 200 determines if the contact information is actually new and is not already present in the contact list in the memory 120 or accessible by the device 190 via the network 180. An example of the contact list in accordance with embodiments of the present system is illustrated in FIG. 3. The illustrated contact list includes eight contact entries, Alan, Bill, Cherry, Chris, Cindy, Dora, Ellen, and Fiona.

Returning to FIG. 2, if the received contact information is new, during act 220, it is determined if the user is interested in pursuing the new contact information. This can be ascertained by the update process 200 requiring that the user confirm its interest or the update process 200 can derive the interest without consulting the user from profile, interest, and historical information about the user stored in the memory 120 or accessible by the device 190 via the network 180. The user interest profile can be used to filter out the contact information that users are not interested in. Such user interest profile can be formed manually by each user or automatically by the update process 200 learning from users' behavior based on existing learning algorithms known to these skilled in the art. Upon determining during act 230 that the user is interested in pursuing the new contact information, the update process 200 updates the contact list (FIG. 3) stored in the memory 120 or stored elsewhere on the network 180, but accessible by the device 190.

Figure 4:
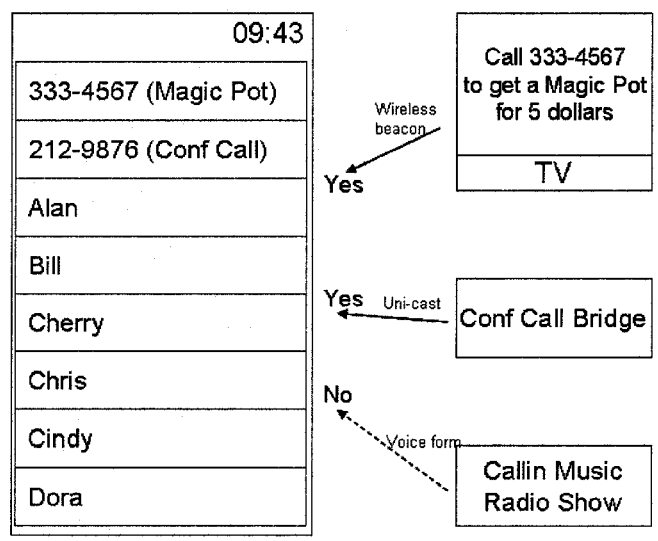
FIG. 4 is a diagram of a contact list accessible by a mobile device after receipt of new contact information from various sources in accordance with embodiments of the present system.

FIG. 4 illustrates a user interface in accordance with embodiments of the present system wherein a contact list updated with contact information received by the device 190. As illustrated, after determining that the user is interested in pursuing the contact information received via the wireless beacon from a television program a "Magic Pot", contact information is added to the contact list. Similarly, after determining that the user is interested in pursuing the contact information received via the uni-cast connection alerting the user to a call bridge conference, a "Conf Call" contact is added to the contact list. However, the contact information received via the voice from the Call-in Music Radio Show was not pursued by the use and thus was not added to the contact list.

After some predetermined time has passed after receipt of the contact information, the contact information loses its usefulness and maintaining useless contact information will waste the space in the contact list (e.g., see FIGS. 3 and 4) and may complicate searches of the necessary contact information within the list. After a given time, for example, after the end of a radio show, a call-in number for the radio show may be no longer useful because the user can no longer call to express an opinion or vote for a contestant, e.g., on the American Idol. Similarly a conference call number is rendered useless upon completion of the conference call. The contact information can carry expiration time or a default duration to indicate how long it should be maintained in the contact list before removal. In other embodiments of the present system, the expiration time may be learned based on past user behavior (e.g., the user never responds to contact information that is more than 1 hour old).

Figure 5:
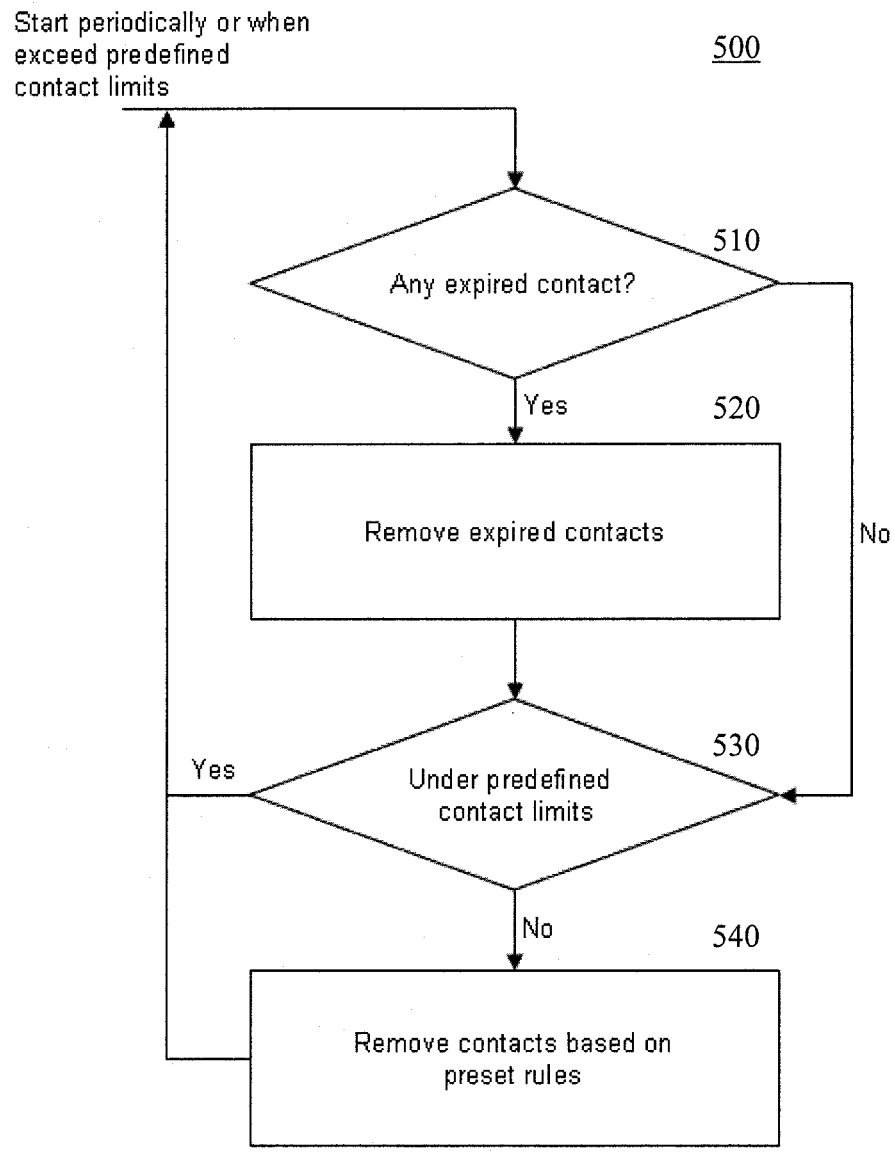
FIG. 5 is a flow chart of a cleanup process executing on a mobile device for cleaning a contact list after a predetermined lifespan of the new contact information in accordance with embodiments of the present system.

To remove the expired contact entries from the contact list, a clean-up process 500 is provided as illustrated in FIG. 5. The clean-up process 500 is triggered periodically based on user preferences or in response to a condition, such as duration of an entry in the contact list exceeding a predefined limit (e.g., exceeded the expiration time) or a number of entries exceeding some preset limit effecting a size of the contact list in memory 120 (FIG. 1). During act 510, the clean up process 500 checks for any expired entries in the contact list and removes them during act 520. During act 530 the clean-up process 500 identifies entries in the contact list that have exceeded some predefined limit and removes them, as shown during act 540, in accordance with predefined rules. The predefined rules can be based on the time at which the contact information was inserted into the contact list, combined with a rule, for example, first in first out, or based on a user defined priority or other preference interests.

Finally, the above discussion is intended to be merely illustrative of the present system and should not be construed as limiting the appended claims to any particular embodiment or group of embodiments.

Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices, portions thereof, acts, etc., may be combined together or separated into further portions, acts, etc., unless specifically stated otherwise;

h) no specific sequence of acts or acts is intended to be required including an order of acts or acts indicated within a flow diagram; and i) the term "plurality of" an element includes two or more of the claimed element, and does not imply any particular range of number of elements; that is, a plurality of elements may be as few as two elements, and may include an immeasurable number of elements.

What is claimed is:

1. A method of managing a contact list on a mobile device, the mobile device being connected to a network, the method comprising acts of:

sensing one or more communications provided by a plurality of broadcast services, the one or more communications including contact information;

selecting the contact information of the sensed one or more communications in which a user of the mobile device is interested;

adding the selected contact information in a contact list associated with the mobile device of the user;

determining if any added contact information has expired; and removing the expired contact information from the contact list associated with the mobile device.

2. The method of claim 1, wherein the one or more communications are emitted from a plurality of sources selected from at least one of television, radio, and public announcement systems.

3. The method of claim 2, wherein the emission is carried out in an audio form.

4. The method of claim 3, wherein the audio form is a human voice.

5. The method of claim 2, wherein the emission is carried out over a wireless beacon.

6. The method of claim 3, wherein the wireless beacon is selected from at least one of a Wi-Fi, Bluetooth, and uni-cast enabled devices.

7. The method of claim 2, wherein the public announcement systems include transportation terminals, transportation stations, supermarkets, movie theaters, malls, airports, and stadiums.

8. The method of claim 1, wherein the contact list resides on at least one of memory connected to the mobile device and a medium to which the mobile device is connected over the network.

9. The method of claim 1, wherein the act of adding the contact information to the contact list does not duplicate contact information pre-existing in the contact list.

10. The method of claim 1, further comprising an act of ascertaining a users interest in pursuing addition of the contact information.

11. The method of claim 10, wherein the users interest is ascertained by at least one of an indication from the user and from a users profile, the users profile including users interest and historical information about the user.

12. The method of claim 11, wherein the users profile is stored in at least one of the memory connected to the mobile device and a medium to which the mobile device is connected over the network.

13. The method of claim 12, wherein the act of selecting comprises an act of using the users profile to filter out the contact information that users are not interested in.

14. The method of claim 11, wherein the users profile is formed manually by the user and automatically by an algorithms learning from users behavior.

15. The method of claim 1, wherein the expiration of the contact information is determined at a time of adding of the contact information into the contact list.

16. An apparatus connected to a network for managing a contact list, the apparatus comprising:
   a processor; and
   a rendering device operationally coupled to the processor, the processor receiving signals from a plurality of sources emitting one or more communications provided by a plurality of broadcast services, sensing contact information from the one or more communications, selecting the contact information in which a user of the mobile device is interested, and rendering the selected contact information in a contact list.

17. The apparatus of claim 16, wherein the rendering device is a touch sensitive device that operates as a user interface for receiving user input related to the rendered contact list.

18. The apparatus of claim 16, wherein the rendering device is a touch sensitive device that operates as a user interface for receiving user input related to selecting the contact information.

19. The apparatus of claim 16, wherein the processor removes expired contact information from the rendered contact list.

20. A processor of a mobile device arranged to manage a contact list rendered on a user interface of the mobile device, the processor comprising:
   a portion sensing one or more communications provided by a plurality of broadcast services, the one or more communications including contact information;
   a portion selecting the contact information of the sensed one or more communications in which a user of the mobile device is interested;
   a portion adding the selected contact information in a contact list associated with the mobile device.

21. The processor of claim 20, the processor comprising:
   a portion determining contact information that has expired; and
a portion removing the expired contact information from the contact list associated with the mobile device.

* * * * *